United States Patent
Addanki (10) Patent No.: US 8,705,551 B2
(45) Date of Patent: Apr. 22, 2014

(54) METHOD AND SYSTEM FOR MANAGEMENT OF FLOOD TRAFFIC OVER MULTIPLE 0:N LINK AGGREGATION GROUPS

(75) Inventor: Venkata Ramana Kiran Addanki, Montvale, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 153 days.

(21) Appl. No.: 13/191,828

(22) Filed: Jul. 27, 2011

(65) Prior Publication Data

US 2013/0028072 A1    Jan. 31, 2013

(51) Int. Cl.
*H04L 12/28* (2006.01)

(52) U.S. Cl.
USPC .......................................................... 370/422

(58) Field of Classification Search
USPC .............. 370/389, 390, 392, 395.3, 252, 222, 370/401
See application file for complete search history.

(56) References Cited

U.S. PATENT DOCUMENTS

| | | | |
|---|---|---|---|
| 6,553,029 B1 | 4/2003 | Alexander | 370/389 |
| 7,623,456 B1 | 11/2009 | Chen et al. | 370/235 |
| 8,295,293 B1 * | 10/2012 | Brown | 370/401 |
| 2003/0043825 A1 * | 3/2003 | Magnussen et al. | 370/401 |
| 2007/0237172 A1 * | 10/2007 | Zelig et al. | 370/465 |
| 2011/0261811 A1 * | 10/2011 | Battestilli et al. | 370/389 |
| 2011/0292789 A1 * | 12/2011 | Long et al. | 370/222 |
| 2011/0299528 A1 * | 12/2011 | Yu et al. | 370/390 |
| 2012/0163391 A1 * | 6/2012 | Shukla et al. | 370/401 |

OTHER PUBLICATIONS

IEEE; "802.1ad", IEEE Computer Society; Virtual Bridged Local Area Networks; pp. 74, May 26, 2006.
IEEE; "802.1AX-2008-LAG", IEEE Computer Society; Link Aggregation; pp. 163, Nov. 3, 2008.

* cited by examiner

*Primary Examiner* — Hassan Kizou
*Assistant Examiner* — Gustavo Lopez-Vargas
(74) *Attorney, Agent, or Firm* — Baker Botts L.L.P.

(57) ABSTRACT

In accordance with embodiments of the present disclosure, a method and system may include receiving a plurality of packets comprising flood traffic of a bridged VLAN domain at an ingress line card port. The system and method may further include splitting the packets into multiple internal streams and forwarding the packets associated with the internal streams to a switch fabric. The system and method may further include forwarding each packet associated with a particular internal stream to one or more egress line cards associated with the internal stream. The system and method may further include mapping each internal stream to a single egress port of the egress line card, the single egress port comprising one of a plurality of egress ports associated with a LAG. The system and method may further include recovery from a port failure.

27 Claims, 5 Drawing Sheets

| LAG TYPE | MGID-LAG_Port MAP |
|---|---|
| 0:8 | 1-P1, 2-P2, 3-P3, 4-P4, 5-P5, 6-P6, 7-P7, 8-P8 |
| 0:4 | 1-P1, 2-P2, 3-P3, 4-P4, 5-P1, 6-P2, 7-P3, 8-P4 |
| 0:3 | 1-P1, 2-P2, 3-P3, 4-P1, 5-P2, 6-P3, 7-P1, 8-P2 |
| 1:1 | 1-PW, 2-PW, 3-PW, 4-PW, 5-PW, 6-PW, 7-PW, 8-PW |

METHOD AND SYSTEM FOR MANAGEMENT OF FLOOD TRAFFIC OVER MULTIPLE 0:N LINK AGGREGATION GROUPS

TECHNICAL FIELD OF THE DISCLOSURE

The present disclosure relates generally to networked communications and, more particularly, to a method and system for management of flood traffic over multiple 0:N Link Aggregation Groups (LAGs).

BACKGROUND

A communication network may include network elements that route packets through the network. Some network elements may include a distributed architecture, wherein packet processing may be distributed among several subsystems of the network element (e.g., line cards, switches, bridges and traffic managers). In some instances, a network element used in a communication network may be a multi-function Ethernet aggregation network element. A multi-function Ethernet aggregation network element may be one which supports many functions, including without limitation link aggregation, hashing, and load balancing.

A multi-function Ethernet aggregation network element may include a distributed architecture including one or more line cards. A line card may comprise a modular electronic device that provides any suitable network communication functionality. For example, a line card may include, among other things, a switch (e.g., an Ethernet switch) for switching traffic through the network element and into a LAN and modules to process data such as frames or packets. The packets or frames may contain information such as source and destination address along with the data.

In addition, a multi-function Ethernet aggregation network element may include in its distributed architecture a bridge. A bridge may comprise a modular electronic device that provides any suitable network communication functionality. For example, a bridge may include, among other things, an Ethernet switch, ports and modules to process hash rules and addresses. The modules may contain processing resources and a memory configured to perform a hash rule that maps data received at ingress ports to output at egress ports. The modules may perform matching on any of the fields provided in a typical Ethernet packet at the ingress port to determine which egress port to map the data too. The data may also be flooded or multicast to all egress ports on the bridge. When data is flooded, packets incoming from one source are transmitted to multiple destinations coupled to the egress ports without duplication. The destinations often share a group address so that only the devices that want the data receive it. In addition, the line cards connected to the egress ports may match on the data intended for its network.

In many instances, communication networks may employ link aggregation. Link aggregation (e.g., IEEE 802.1AX-2008) may generally describe the practice of using multiple network cables or ports in parallel to increase the link speed beyond the limits of any one single cable or port, and to increase redundancy for higher availability. In link aggregation, a group or set of ports may be combined and represented as a single logical port to other components of the network system. Various switching elements of the network system may "see" the aggregated ports (known as a "link aggregation group" or "LAG") as a single logical communication port in the routing tables or databases of network elements external to the LAG.

In addition, to ensure high reliability and availability in communication networks, load balancing is often used. When implemented, load balancing typically provides for effective utilization of bandwidth for the network. In load balancing, the data stream at the ingress port is divided and transmitted on multiple ports in the LAG at the egress port. Since each LAG may have a unique line rate and a unique number of ports, load balancing may be managed based on the these variables. The management of the load balancing may be performed in the Ethernet bridge by a hash rule performed on the member ports of the LAG. However, in today's networks the load balancing and hashing may only be performed when the traffic egresses the LAG, which may contain several number of ports.

However, if the communication network such as the one described above is acting as a provider bridge, the same hash rule cannot be applied to traffic of different customers as the characteristics of each customer traffic egressing on same LAG may be unique. The traffic may be uniquely identified by customer Virtual Local Area Network (VLAN) IDs as described in IEEE 802.1ad. The customer traffic has to be hashed at the ingress itself with a single hash-rule applied for that flow. However, traffic from each customer must often be hashed with different rules. In addition, the unique customer traffic may be flooded under the same Provider VLAN. The Provider VLAN may have multiple LAGs with each of them containing a different number of LAG ports. In this situation, it is difficult to hash at ingress and correctly map the actual LAG port at the egress when traffic is flooding. In addition, a provider bridge may have thousands of LAGs to manage within a flooding domain. If the provider bridge can only hash and port map at the ingress, this would require each ingress to comprehend all LAGs interface information. This requires complex software to configure, manage and maintain the provider bridge.

SUMMARY

In accordance with a particular embodiment of the present disclosure, a method and system for management of flood traffic over multiple 0:N link aggregation groups is provided. In accordance with some embodiments of the present disclosure, a method and system may include receiving a plurality of packets comprising flood traffic of a bridged VLAN domain at a port of an ingress line card. The system and method may further include splitting the packets into multiple internal streams and forwarding the packets associated with the internal streams to a switch fabric. The system and method may further include forwarding each packet associated with a particular internal stream to one or more egress line cards associated with the internal stream. The system and method may further include mapping each internal stream to a single egress port of the egress line card, the single egress port comprising one of a plurality of egress ports associated with a Link Aggregation Group (LAG). The system and method may further include recovery from a port failure.

Technical advantages of one or more embodiments of the present disclosure may include the ability to assign multiple hash rules for each customer or provider VLAN flow at the ingress port. In the example embodiment, at the ingress card, the traffic may be hashed into eight streams each of them identified by a MGID prior to propagating through the switch fabric. In the switch fabric, for example, each stream may then be mapped to the egress cards based on port distribution/selection determined by the hash rule. At the egress card, the stream may then be mapped to the appropriate LAG port.

Technical advantages of one or more embodiments of the present disclosure may also include the ability to redirect the traffic when a failure occurs on a LAG. If a failure occurs, for example, the module in the switch fabric that manages the port distribution/selection, may move a stream from one egress card to another egress card if required. This allows the provider to effectively maintain and manage quality of service (QoS) or traffic throughput rates. In addition to maintaining traffic flow in a provider network, the flexibility is key and may provide for improved client services and less complex hardware or software requirements for implementation.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
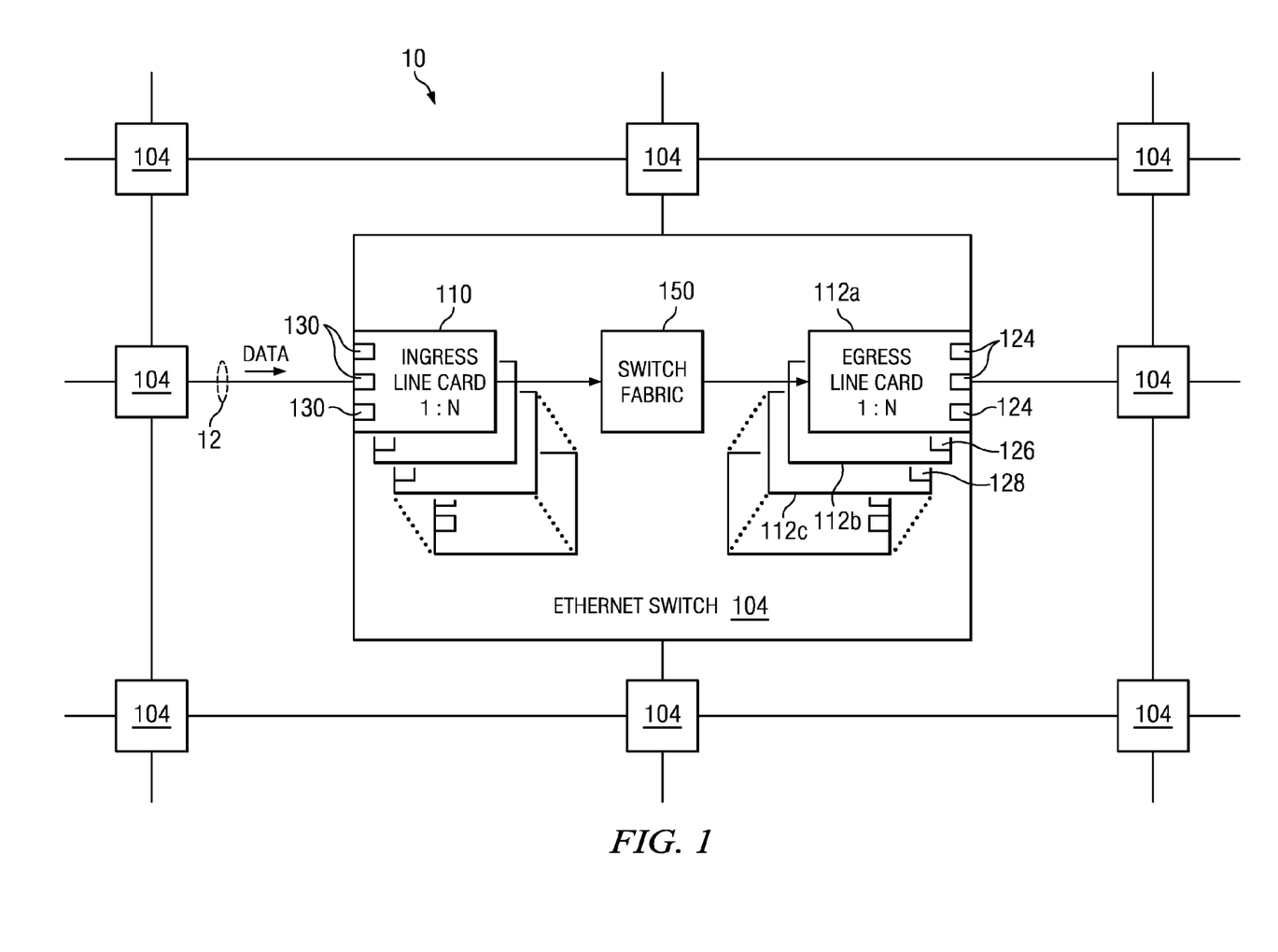
FIG. 1 illustrates a block diagram of an example node in a communication network.

FIG. 1 illustrates a block diagram of an example network 10, in accordance with certain embodiments of the present disclosure. In certain embodiments, network 10 may be an Ethernet network. Network 10 may include one or more transmission media 12 operable to transport one or more signals communicated by components of network 10. The components of network 10, coupled together by transmission media 12, may include a plurality of Ethernet switches 104. In the illustrated network 10, each Ethernet switch 104 is coupled to an Ethernet switch 104 via a plurality of ingress line cards 110 and egress line cards 112. Any suitable configuration of any suitable number of Ethernet switches with any suitable number of lines cards may create network 10. Although network 10 is shown in a particular configuration, network 10 may also be configured as a ring network, a point-to-point network, or any other suitable network or combination of networks. Network 10 may be used in a local area network (LAN), a wide area network (WAN), or any other suitable network or combination of networks.

Each transmission medium 12 may include any system, device, or apparatus configured to communicatively couple Ethernet switches 104 to each other and communicate information between corresponding Ethernet switches 104. For example, a transmission medium 12 may include an optical fiber, an Ethernet cable, a T1 cable, a WiFi signal, a Bluetooth signal, or other suitable medium.

Network 10 may communicate information or "traffic" or data streams over transmission media 12. As used herein, "traffic" or data streams means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Ethernet switch 104 in network 10 may also comprise one or more ingress line cards 110 and one or more egress line cards 112. The data will arrive at one or more ports 130 of one or more ingress line cards 110 and be dispatched to another point in the network via ports 124, 126 or 128 on the egress line card 112. A line card 110 or 112 may be communicatively coupled via a transmission medium 12 between Ethernet switch 104 and may include any suitable system, apparatus, or device configured to serve as an interface between a Ethernet switches 104 in network 10. A line card 110 or 112 may enable its associated Ethernet switch to communicate to other Ethernet switches 104 using any suitable transmission protocol and/or standard. A line card 110 or 112 may be implemented using hardware, software, or any combination thereof. For example, a line card 110 or 112 may comprise an Ethernet port, an optical port, or any other suitable port. Some of the ingress lines cards 110 may be interfaced to clients (e.g., customers) of a network provider while other of egress lines cards 112 may be interfaced to the provider network.

The Ethernet switch may contain a hash rule and switch fabric 150 to manage communication of traffic from the ingress line cards 110 to the egress line cards 112. The switch fabric 150 may match on information such as source or destination address in the Ethernet packet or frame arriving at the ingress line card 110 to determine where to route the data. In addition, the modules may match on a Provider ID within the frame or header to determine where to route the data. The hash rule may be applied to incoming Ethernet packets and applied at the egress ports. There also may time when the hash rule at the ingress (incoming port) may match to a group address. The packets may then be flooded or multicast to most or all of the egress ports 112.

Line cards 110 and 112 and switch fabric 150 in Ethernet switch 104 may include logic and memory. Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk).

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
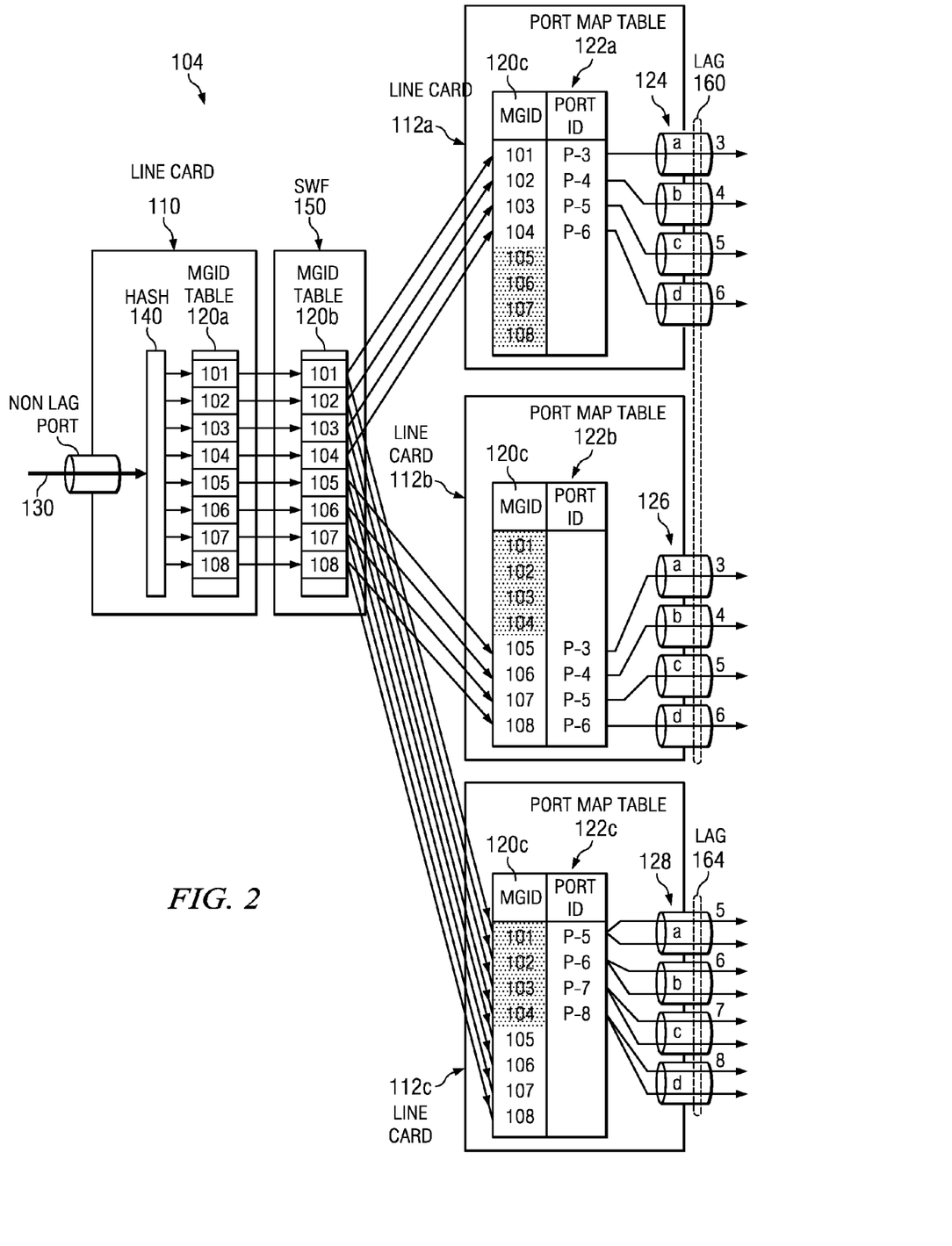
FIG. 2 illustrates a block diagram of an example load balancing in a 0:N LAG, according to a particular embodiment of the present disclosure.

FIG. 2 illustrates a block diagram of an example of load balancing in a 0:N LAG, in accordance with certain embodiments of the present disclosure. As discussed above, in an Ethernet switch 104 one or more ingress line cards 110 may be coupled to one or more egress line cards 112 through a switch fabric 150. Line cards 110 may generally be configured to receive data and transmit data through switch fabric 150 to egress line cards 112. Switch fabric 150 (SWF) may be configured to manage packet flow between ingress and egress line cards 110 and 112. In certain embodiments, switch fabric may be a combination of hardware and software to manage receiving, processing and forwarding data or packets through an Ethernet switch 104. The switch fabric may include computer readable medium (e.g., memory) and processing resources, not explicitly shown, to buffer and/or forward the data to its destination.

In FIG. 2, the ports 130 on a particular ingress line card 110a receive the data. Data received at the ingress line card may be in the form of packet. If the system does not know what to do with the packets, some data received at the ingress line cards may need to be flooded to multiple destinations. The flooding of data would normally cause all ports on the egress card. To balance the load of a data, avoid sending the same data to every port and provide protection within a network, one or more egress ports may be grouped to form a Link Aggregate Group (LAG). In a LAG, a stream of data may be divided amongst several ports by a hash rule to speed the transmission of the data. However, in current systems only a single hash rule may be applied. If a single hash rule may only be applied at the ingress ports, then egress ports may not be effectively loaded to transmit data, especially if there are different line rates or LAG sizes within the system. In this embodiment of the present invention, multiple hash rules may be applied. This effectively balances the loading of data within the larger network and compensates for different line rates that may be available within the network. This will be described in further detail below.

As discussed above, line cards 110 may include one or more ports 130 to receive Ethernet data. In general, Ethernet data is transmitted in packets and a flow of more than one packet forms a stream. A packet may contain multiple fields which may include data, times stamps, source/destination addresses and other identifying information. Ethernet data may be flooded or transmitted to more than one destination or egress port. Ethernet switch 104 may have processing resources and memory, not explicitly shown, to execute and store a hash rule 140 that divides the incoming data stream or traffic into multiple streams. Line cards 110 and 112 may also have processing resources to further apply rules or mappings to traffic received at ingress line cards 110. In this embodiment, the data received at a port 130 of ingress line card 110a is hashed into eight streams that are mapped via Multicast Group ID (MGID) tables 120 to ports on egress line cards 112. This mapping may occur in three stages, 120a, 120b and 120c, as the data traverses ingress line card 110, switch fabric 150 and egress line cards 112. This mapping will be described in further detail below.

Although, in this embodiment, each egress line card 112 has eight physical ports with four physical ports shown in the example, egress line card 112 may include more or less physical ports. One or more ports from different line cards 112 may be combined to create a Link Aggregation Group (LAG). The LAG may be seen logically as the same port to the external network even in instances where the physical ports are not located on the same line card. The LAGs are created so that a data stream can be divided among the line cards 112 within a LAG during transmission. This effectively increases the bandwidth or data rate of the transmission at the egress line cards 112 since the data is divided and transmitted in parallel on the ports within a LAG. In the example of FIG. 2, line card 112a and line card 112b each have four of their ports grouped together to form a LAG 160. LAG 160 may be a 0:8 LAG when four ports from line card 112a and four ports from line card 112b are grouped. In a 0:8 LAG, each of the eight streams of data will be mapped to a unique port. Four of the ports from line card 112c are grouped to form a second LAG 164. LAG 164 may be a 0:4 LAG when each of the four ports may have two streams mapped to it. A 0:4 LAG and a 0:8 LAG will be discussed in further detail in FIG. 3.

In FIG. 2, the hash rule 140 is performed on the ingress data from line card 110. The hash rule 140 defines how the data is identified and directed to different on egress line cards 112. Hash rule 140 may be defined to sort data received at the ports on ingress line card 110 based on the following rules, for example:

1. Internal hardware flow ID
2. The Media Access Control (MAC) source/destination address plus the MAC Internet Protocol (IP) source/destination address
3. The outer Virtual Local Area Network ID (VLAN ID or VID)
4. The Multi-protocol Label Switching (MPLS) label plus the IP source/destination address.

Although four rules were listed as an example, the list is by no means exhaustive and hash rule 140 may be defined with different or additional parameters in any suitable combinations. In the example in FIG. 2, the hash rule has divided the data into eight streams of packets. The eight streams may be determined when the hash rule may match on one of the parameters mentioned above. The hash rule may utilize an algorithm such as a CRC (cyclic redundancy check) on the packet to determine a hash value. To determine the hash value, the CRC algorithm may utilize the data from the packet in binary form and perform logical computations on it. The packet binary data may then be shifted left and the upper bits (divisor) of the shifted data exclusive or'ed with the shifted packet binary data. The packet binary data may be shifted left again and the divisor shifted right before the exclusive or operation may be performed again. This process may be continued until the shifted packet data appears as all zeros and there may be a three bit remainder. The three bit remainder of the CRC may be the resulting hash value. In the example in FIG. 2, the hash value calculated with the CRC determines the eight Multicast Group ID (MGID) 120 which may be used to map data as it progresses through Ethernet switch 104 to the egress line cards 112. In the ingress line card 110, the MGID is inserted into an internal header for each packet. In the switch fabric 150, the MGID 120b from the packet may be used to map the packets to line cards 112a-c. In this embodiment, three line cards 112a-c may be available for mapping. As shown in the example of FIG. 2, MGID 101, 102, 103 and 104 both are mapped to line card 112a and line card 112c. In addition, MGID 105, 106, 107 and 108 are mapped to line card 112b and line card 112c.

In each egress line card 112, the MGID 120c may be used with a port-map table 122 to map the associated packets to a port on line card 112. In the example FIG. 2, the port-map table 122a on egress line card 112a identifies physical ports 124 that may be available to transmit data. Port map table 122a contains the MGID 120c and Port IDs P-3, P-4, P-5 and P-6. Port identifiers (ID) P-3 through P-5 on port map table 122a and its associated MGID 120c indicates the path for the data at the egress port. For example, packets with MGID 101 in its header may be transmitted to physical port 124a. In addition packets with MGID 102 in its header may be transmitted to physical port 124b, packets with MGID 103 in its header may be transmitted to physical port 124c, and MGID 104 may be transmitted to physical port 124d.

In egress line card 112b, packets with MGID's 105-108 may be transmitted to physical ports 126a-d as indicated by port map table 122b. Port map table 122b may include identifiers for physical ports 126a-d. Packets with MGID 105 in its header may be transmitted to physical port 126a. In addition, packets with MGID 106 in its header may be transmitted to physical port 126b, packets with MGID 107 in its header may be transmitted to physical port 126c, and packets with MGID 108 in its header may be transmitted to physical port 126d.

In addition, in this embodiment, egress lines card 112a and 112b may be grouped to form a 0:8 LAG 160. Although, egress line cards 112a and 112b are physically separate, the eight ports may be grouped together in hardware and/or software to appear logically together. Thus, the eight streams of data with MGID's 101-108 created by hash 140 on ingress line card 110, may be physically transmitted on two separate egress line cards 112a ports 124 and egress line card 112b ports 126 as described above.

In this embodiment in egress line card 112c, packets with MGID's 101-108 may be transmitted to physical ports 126a-d as indicated by port map table 122c. Packets with MGID 101 and MGID 105 in their header may be transmitted to physical port 128a. In addition, MGID packets with MGID 102 and MGID 106 in their header may be transmitted to physical port 128b, packets with MGID 103 and MGID 107 in their header may be transmitted to physical port 128c and packets with MGID 104 and MGID 108 in their header may be transmitted to physical port 128d. In this embodiment, LAG 164 may be defined as a 0:4 LAG. In a 0:4 LAG, one or more data streams may be mapped to a single physical port.

Although this example describes the data mapped to both LAGs 160 and 164, in other embodiments, the streams may be mapped to single line cards or multiple line cards depending on the application or Ethernet protocol in use. In addition, the mappings and identifiers may be mapped in hardware or software or any combination of the two. Accordingly, the above description of the embodiments does not constrain this disclosure. Other changes, substitutions, and alterations are possible without departing from the spirit and scope of this disclosure.

Figure 3:
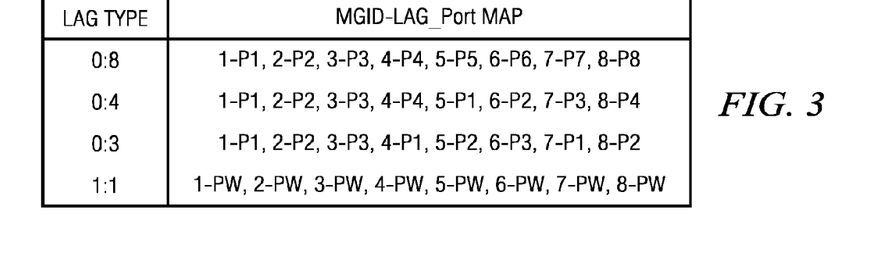
FIG. 3 illustrates an example implementation of Multicast Group ID (MGID) to Link Aggregation Group (LAG) port mapping, according to a particular embodiment of the present disclosure.

FIG. 3 illustrates an example implementation of Multicast Group ID (MGID) to Link Aggregation Group (LAG) port mapping, according to a particular embodiment of the present disclosure. In this example, the traffic is hashed into eight streams or MGIDs at the ingress line card and the LAG types at the egress line card include 0:8, 0:4, 0:3 or 1:1. The MGID to LAG port map may be represented as [stream-port].

In the mapping for the 0:8 LAG for example, each stream may be mapped to a unique physical port. A map of 1-P1 may indicate that data stream 1 is mapped to port 1 of the 0:8 LAG, 2-P2 may indicate that stream 2 is mapped to port 2 of the 0:8 LAG, 3-P3 may indicate that stream 3 is mapped to port 3 of the 0:8 LAG, 4-P4 may indicate that stream 4 is mapped to port 4 of the LAG, 5-P5 may indicate that stream 5 is mapped to port 5 of the LAG, 6-P6 may indicate that stream 6 is mapped to port 6 of the LAG, 7-P7 may indicate that stream 7 is mapped to port 7 of the LAG and 8-P8 may indicate that stream 8 is mapped to port 8 of the LAG.

However, in the 0:4 LAG, for example, only four ports are available so two streams may be assigned to each physical port. A map of 1-P1 and 5-P1 may indicate that stream 1 and stream 5 both map to port 1. A map of 2-P2 and 6-P2 may indicate that stream 2 and stream 6 both map to port 2. A map of 3-P3 and 7-P3 may indicate that stream 3 and stream 7 both map to port 3. A map of 4-P4 and 8-P4 may indicate that stream 4 and stream 8 both map to port 4. Therefore, in the 0:4 LAG type, two streams may both be mapped to a single physical port.

In the 0:3 LAG type, a map of 1-P1, 4-P1 and 7-P1 may indicate that streams 1, 4 and 7 are mapped to port 1. A map of 2-P2 and 5-P2 may indicate that streams 2 and 5 are mapped to port 2. A map of 3-P3 and 6-P3 may indicate that streams 3 and 6 are mapped to port 3.

In the 1:1 case, the W may indicate a working port. All streams may be mapped to the working port and the streams may be mapped such that ordering of the data is maintained. The mappings may be chosen as part of a network solution for load balancing and quality of service (or maintaining data flow). The more ports available for mapping within a LAG, the higher your data throughput may be. Also, if a port fails, data flow may not be disrupted. Data may be remapped to another port within the LAG to maintain data flow. The data remapping will be described in further detail in FIGS. 4-5.

Figure 4:
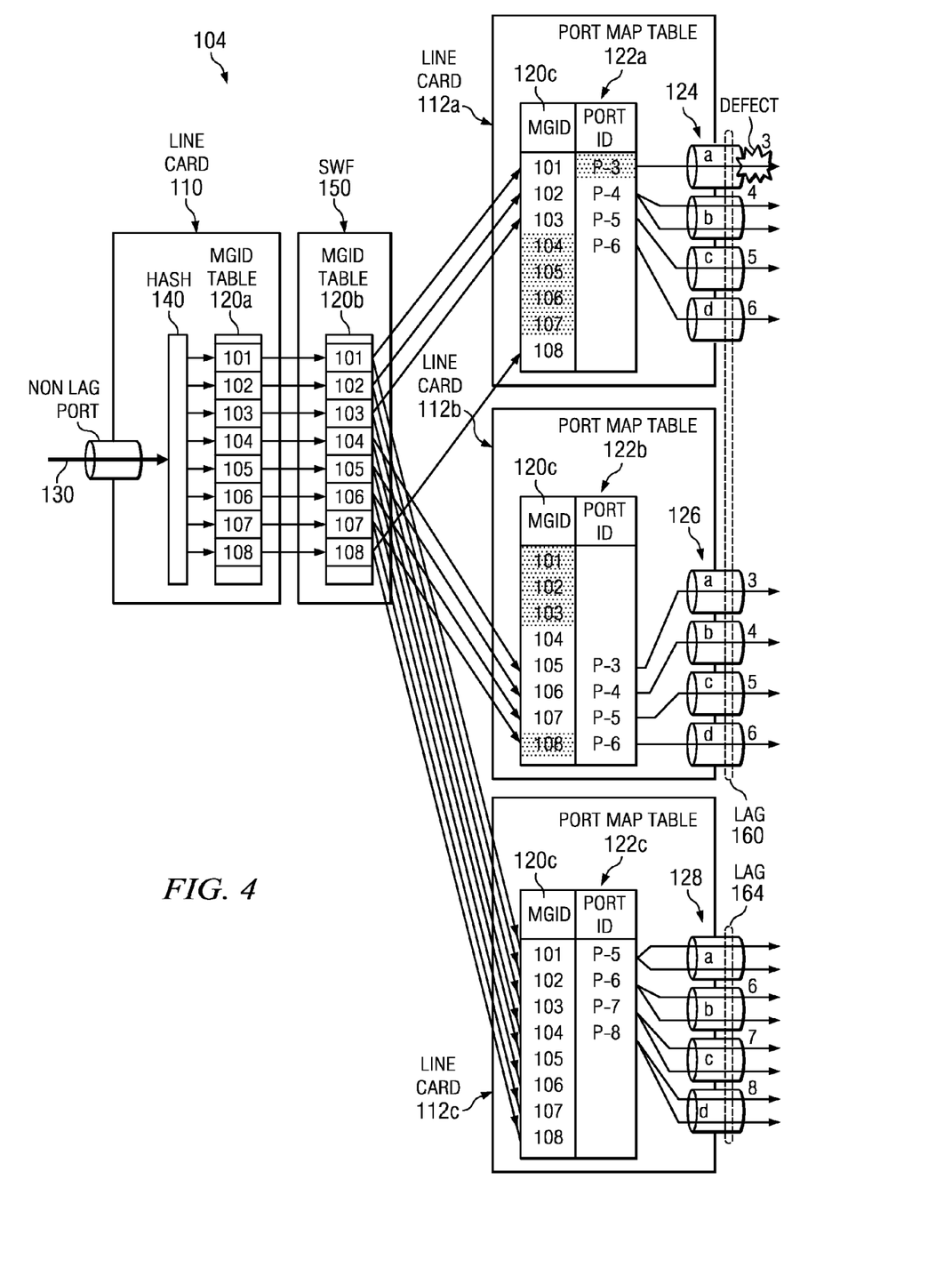
FIG. 4 illustrates a block diagram of the example of load balancing in a 0:N LAG of FIG. 2 when a link on a line card fails, according to a particular embodiment of the present disclosure.

FIG. 4 illustrates a block diagram of the example of load balancing in a 0:N LAG of FIG. 2 when a port on a line card fails, according to a particular embodiment of the present disclosure. As described in FIG. 2 and shown again in FIG. 4, there are two LAGs in the example network. The first LAG 160 is a 0:8 LAG and the second LAG 164 is a 0:4 LAG. In the example in FIG. 4, port 124a in the first 0:8 LAG 160 on line card 112a fails. The data stream associated with the port that failed may be shifted to the next available port. In the example in FIG. 4, the data associated with MGID 101 in MGID table 120c may be shifted from port 124a, the defective port, to port 124b as indicated in the port table map 122a. Since P-3 and thus physical port 124a, is no longer available, MGID 101 may be mapped to P-4 which may identify port 124b. When port 124a fails, the MGID table 120b in switch fabric 150 may be updated to indicate a stream may be moved a different line card. In the example of FIG. 4, MGID 108 in MGID table 120b of switch fabric 150 may be remapped from egress line card 112b to egress line card 112a in response to the failure of port 124a. The mapping of MGID 108 to line card 112c in LAG 164 may remain unchanged by re-mappings for LAG 160 on egress line cards 112a and 112b. The MGID table 120 of switch fabric 150 may map MGIDs 101-103 and 108 to line card 112a and the MGIDs 104-107 to egress lines card 112b. In addition, in response to the failure of port 124a, the port map tables 122a and 122b may be updated to reflect the shift in the data stream in response to the failure of port 124a. Thus the new mapping on egress line card 112a may be MGID 101 to physical port 124b, MGID 102 to physical port 124c, MGID 103 to physical port 124d and MGID 108 to physical port 124b. The new mapping on egress line card 112b may be MGID 104 to physical port 126a, MGID 105 to physical port 126b, MGID 106 to physical port 126c, MGID 107 to physical port 126d. Line card 112c may be unaffected by the changes to line card 112a and 112b.

Figure 5:
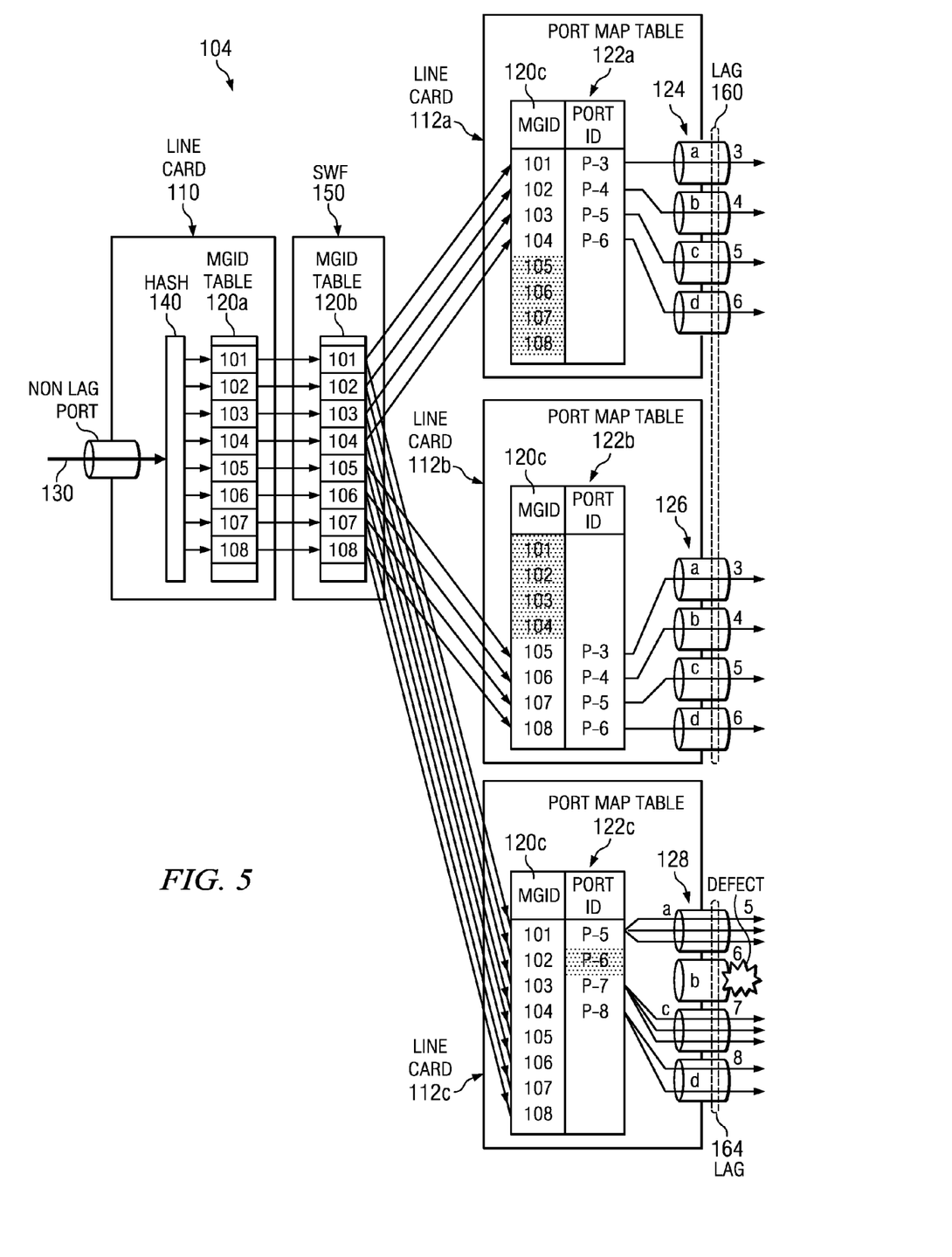
FIG. 5 illustrates a block diagram of the example of load balancing in a 0:N LAG of FIG. 2 when a different link on a line card fails, according to a particular embodiment of the present disclosure.

FIG. 5 illustrates a block diagram of the example network element of FIG. 2 when a port on a line card fails, according to a particular embodiment of the present disclosure. As described in FIG. 2 and shown again in FIG. 5, there are two LAGs in the example network. The first LAG 160 is a 0:8 LAG and the second LAG 162 is a 0:4 LAG. In the example in FIG. 5, port 128b on line card 112c fails. Since port 128b is not available, the data originally assigned to port 128b may remapped to another port. LAG 160 is unaffected by the failure of port 128b of LAG 164. Furthermore, even though LAG 164 is affected, in this example, the MGID table 120b in switch fabric 150 may not need to be updated to reflect the failure of port 128b since all of the streams associated with MGIDs 101-108 map to line card 112c. In this example, the port-map table 122c in egress line card 112c may be updated in response to the defect on port 128b. The new port mapping may map MGIDs 101, 104 and 108 to physical port 128a. In addition, MGIDs 102 and 105 may be mapped to physical port 128c and MGIDs 103 and 107 may be mapped to physical port 128d. Therefore, in response to the failure, 0:4 LAG 164 may have three streams of data transmitted on more than one port instead of two streams of data transmitted. LAG 160 on egress line card 112a and 112b may be unaffected by the failure of port 128b on egress line card 112c in LAG 164.

Figure 6:
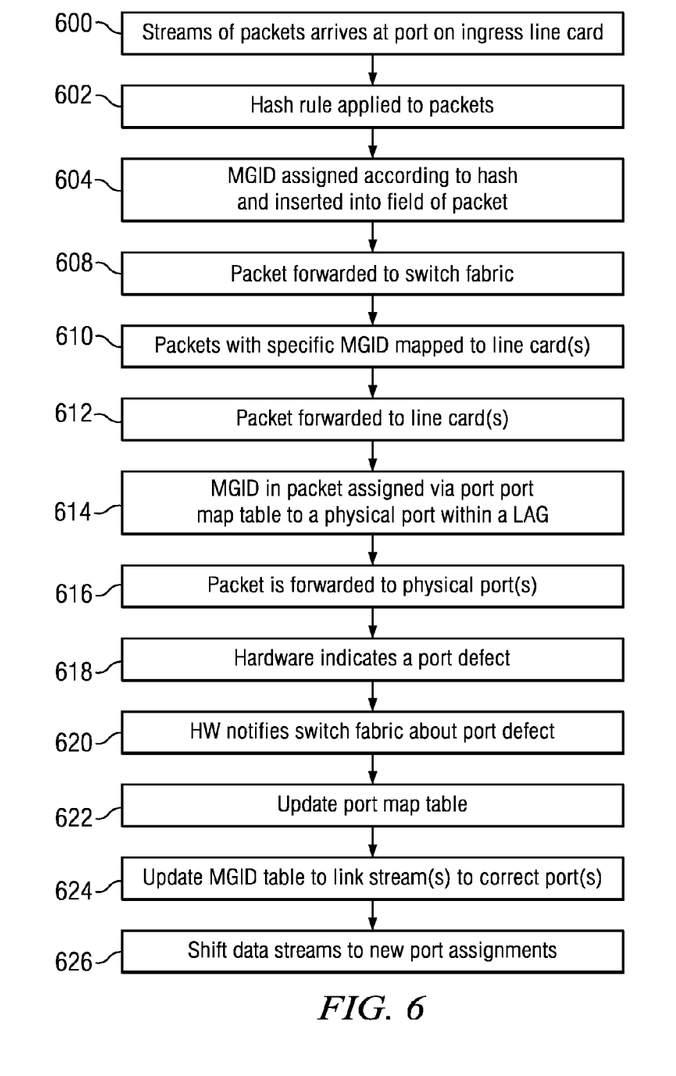
FIG. 6 illustrates a block diagram illustrating an example method for management of provider-bridge flood traffic when a port failure occurs, according to a particular embodiment of the present disclosure.

FIG. 6 illustrates a block diagram illustrating an example method for management of flood traffic when a port failure occurs, according to a particular embodiment of the present disclosure. In step 600, streams of packets arrive at a port on an ingress line card. In this example, the data is hashed at step 602 to divide the single steam into multiple streams. The multiple streams may be distributed across multiple LAG ports of egress line cards that are grouped into a LAG. The hash in step 602 may include locating identifying data within the packet an applying a rule or an algorithm to calculate a CRC, for example. In step 604, a Multicast Group ID (MGID) may determined based on the results of the hashing and inserted into the packet prior to forwarding the packet to the switch fabric. In general, the switch fabric manages and forwards the packets to the appropriate egress line cards within an Ethernet switch. In step 608, the packet may be forwarded to the switch fabric. In step 610, the switch fabric determines which packet with specific MGIDs may be transmitted to the egress line card. In step 612, packets with specific MGIDs may be forwarded to specific egress line cards. In step 614, the port map table may determine, with the MGID, which port the packets will be transmitted on. In step 618, hardware (HW) indicates that a port on the egress line card has failed. Since the port has failed, data may no longer be transmitted on the port. In step 620, hardware notifies the switch fabric (SWF) that a port on an egress line card has failed. The switch fabric manages the routine of the data from the ingress line card to the egress line card. In response to a failure, the MGID table may be updated to reflect a MGID re-mapped to a port on different egress line card or a different port on the same egress line card. In step 622, the port-map table on the egress line card with the defective port may be updated to reflect the loss of an available port. The data associated with the MGID's may be remapped in step 624 to different available physical ports via the port-map table on the egress line cards. The LAG configuration may determine how many streams of data are mapped to a single physical port. In step 626, the data stream (s) are shifted to the new port assignments.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   receiving a plurality of packets at a port of an ingress line card, each packet associated with a virtual local area network (VLAN) and comprising traffic to be flooded in the associated VLAN;
   splitting the packets into multiple internal streams;
   forwarding the packets associated with the internal streams to a switch fabric;
   at the switch fabric, determining one or more egress line cards of a plurality of line cards to which each internal stream is to be forwarded;
   forwarding each packet associated with a particular internal stream to the one or more determined egress line cards based on the associated internal stream;
   mapping the packets of each internal stream to a single egress port of each egress line card to which the packets of each internal stream are forwarded, the single egress port comprising one of a plurality of egress ports associated with a Link Aggregation Group (LAG); and
   forwarding each packet to the egress port based on the mapping.

2. A method according to claim 1, wherein splitting the packets into multiple internal streams comprises hashing the packets to assign a Multicast Group ID (MGID) to each packet.

3. A method according to claim 2, further comprising determining an egress line card for each packet based on the associated MGID; and
   wherein mapping the internal streams of the packets to an egress port of the egress line card comprises mapping the MGID associated with each received packet to one of the plurality of egress ports of the LAG.

4. A method according to claim 2, further comprising inserting the MGID into a header associated with the packet.

5. A method according to claim 2, wherein hashing comprises matching an internal hardware flow ID.

6. A method according to claim 2, wherein hashing comprises matching a Media Access Control (MAC) address plus an Internet Protocol (IP) source and destination address.

7. A method according to claim 2, wherein hashing comprises matching an outer Virtual Local Area Network ID (VID).

8. A method according to claim 2, wherein hashing comprises matching an MPLS label plus an Internet Protocol (IP) source and destination address.

9. A method according to claim 3, further comprising recovering from a port failure by:
   identifying a port defect;
   notifying the switch fabric about the port defect;
   updating the mapping, at the egress line cards, of the MGID associated with each received packet to one of a plurality of ports of the LAG;
   updating the mapping of the MGID associated with each received packet in the switch fabric to remap the packets to the correct line card; and
   transmitting the data streams to the new port assignments.

10. A system comprising:
    processing resources;
    memory;
    an ingress line card configured to:
      receive a plurality of packets at a port of an ingress line card, each packet associated with a virtual local area network (VLAN) and comprising traffic to be flooded in the associated VLAN;
      split the packets into multiple internal streams;
      forward the packets associated with the internal streams to a switch fabric; wherein the switch fabric is configured to:
  determine one or more egress line cards of a plurality of line cards to which each internal stream is to be forwarded;
  forward each packet associated with a particular internal stream to the one or more determined egress line cards based on the associated internal stream;
an egress line card configured to:
  map the packets of each internal stream to a single egress port of each egress line card to which the packets of each internal stream are forwarded, the single egress port comprising one of a plurality of egress ports associated with a Link Aggregation Group (LAG); and
  forward each packet to the egress port based on the mapping.

11. A system according to claim 10, wherein splitting the packets into multiple internal streams comprises hashing the packets to assign a Multicast Group ID (MGID) to each packet.

12. A system according to claim 11, further comprising determining an egress line card for each packet based on the associated MGID; and
  wherein mapping the internal streams of the packets to an egress port of the egress line card comprises mapping the MGID associated with each received packet to one of the plurality of egress ports of the LAG.

13. A system according to claim 11, further comprising inserting the MGID into a header associated with the packet.

14. A system according to claim 11, wherein hashing further comprises matching an internal hardware flow ID.

15. A system according to claim 11, wherein hashing further comprises matching a Media Access Control (MAC) address plus an Internet Protocol (IP) source and destination address.

16. A system according to claim 11, wherein hashing further comprises matching an outer Virtual Local Area Network ID (VID).

17. A system according to claim 11, wherein hashing further comprises matching an MPLS label plus an Internet Protocol (IP) source and destination address.

18. A system according to claim 12, wherein:
  the egress line card is further configured to:
    identify a port defect;
    notify the switch fabric about the port defect;
    update the mapping, at the egress line cards, of the MGID associated with each received packet to one of a plurality of ports of the LAG;
  the switch fabric is further configured to:
    update the mapping of the MGID associated with each received packet in the switch fabric to remap the packets to the correct line card; and
    transmit the data streams to the new port assignments.

19. An article of manufacture, comprising:
a non-transitory computer readable medium; and
computer-executable instructions carried on the non-transitory computer readable medium, the instructions readable by a processor, the instructions, when read and executed, for causing the processor to:
  receive a plurality of packets at a port of an ingress line card, each packet associated with a virtual local area network (VLAN) and comprising traffic to be flooded in the associated VLAN;
  split the packets into multiple internal streams;
  forward the packets associated with the internal streams to a switch fabric;
  determine one or more egress line cards of a plurality of line cards to which each internal stream is to be forwarded;
  forward each packet associated with a particular internal stream to the one or more determined egress line cards based on the associated internal stream;
  map the packets of each internal stream to a single egress port of each egress line card to which the packets of each internal stream are forwarded, the single egress port comprising one of a plurality of egress ports associated with a Link Aggregation Group (LAG); and
  forward each packet to the egress port based on the mapping.

20. An article of manufacture according to claim 19, wherein splitting the packets into multiple internal streams comprises hashing the packets to assign a Multicast Group ID (MGID) to each packet.

21. An article of manufacture according to claim 20, further comprising determining an egress line card for each packet based on the associated MGID; and
  wherein mapping the internal streams of the packets to an egress port of the egress line card comprises mapping the MGID associated with each received packet to one of the plurality of egress ports of the LAG.

22. An article of manufacture according to claim 20, further comprising inserting the MGID into a header associated with the packet.

23. An article of manufacture according to claim 20, further comprising hashing to match an internal hardware flow ID.

24. An article of manufacture according to claim 20, further comprising hashing to match a Media Access Control (MAC) address plus an Internet Protocol (IP) source and destination address.

25. An article of manufacture according to claim 20, further comprising hashing to match an outer Virtual Local Area Network ID (VID).

26. An article of manufacture according to claim 20, further comprising hashing to match an MPLS label plus an Internet Protocol (IP) source and destination address.

27. An article of manufacture according to claim 21, further comprising recovering from a port failure by:
  identifying a port defect;
  notifying the switch fabric about the port defect;
  updating the mapping, at the egress line cards, of the MGID associated with each received packet to one of a plurality of ports of the LAG;
  updating the mapping of the MGID associated with each received packet in the switch fabric to remap the packets to the correct line card; and
  transmitting the data streams to the new port assignments.

* * * * *